(12) United States Patent
Ladner (10) Patent No.: US 11,499,698 B2
(45) Date of Patent: Nov. 15, 2022

(54) SWEEPING ILLUMINATOR FOR AQUARIUM TANKS

(71) Applicant: Zachary Daniel Ladner, Martinez, CA (US)

(72) Inventor: Zachary Daniel Ladner, Martinez, CA (US)

(*) Notice: Subject to any disclaimer, the term of this patent is extended or adjusted under 35 U.S.C. 154(b) by 5 days.

(21) Appl. No.: 17/167,042

(22) Filed: Feb. 3, 2021

(65) Prior Publication Data

US 2021/0247050 A1 Aug. 12, 2021

Related U.S. Application Data

(60) Provisional application No. 62/972,576, filed on Feb. 10, 2020.

(51) Int. Cl.
| | |
|---|---|
| *F21V 14/02* | (2006.01) |
| *F21V 21/088* | (2006.01) |
| *A01K 63/06* | (2006.01) |
| *F21Y 115/10* | (2016.01) |
| *F21W 131/308* | (2006.01) |

(52) U.S. Cl.
CPC .............. *F21V 14/02* (2013.01); *A01K 63/06* (2013.01); *F21V 21/088* (2013.01); *F21W 2131/308* (2013.01); *F21Y 2115/10* (2016.08)

(58) Field of Classification Search
CPC ....... F21V 14/02; F21V 21/088; A01K 63/06; F21W 2131/308
See application file for complete search history.

(56) References Cited

U.S. PATENT DOCUMENTS

| | | |
|---|---|---|
| 6,250,768 B1 | 6/2001 | Hill |
| 2010/0307423 A1 | 12/2010 | Tunze |
| 2012/0044713 A1 | 2/2012 | Chiang et al. |
| 2015/0035437 A1* | 2/2015 | Panopoulos ............ F21S 8/085 315/291 |
| 2015/0156995 A9 | 6/2015 | Tang et al. |
| 2018/0084765 A1 | 3/2018 | Kanwal et al. |

OTHER PUBLICATIONS

ISA/US, "Notification of Transmittal of the ISR and the Written Opinion of the International Searching Authority, or the Declaration," in PCT Application No. PCT/US2021/016679, dated Jun. 1, 2021, 8 pages.

* cited by examiner

*Primary Examiner* — Karabi Guharay
(74) *Attorney, Agent, or Firm* — Kang S. Lim (57) ABSTRACT

A sweeping illumination system illuminates an aquarium with organisms requiring simulated sunlight for survival. The illumination system includes a downward-facing light housing for illuminating a top surface of the aquarium. A support arm is coupled to the light housing and enables the light housing to sweep a pattern across the top surface of the aquarium. The sweep pattern can be semi-circular or semi-elliptical along a plane parallel to the top surface of the aquarium.

12 Claims, 11 Drawing Sheets

SWEEPING ILLUMINATOR FOR AQUARIUM TANKS

CROSS REFERENCE TO RELATED APPLICATION

This non-provisional application claims priority to U.S. Provisional Application No. 62/972,576, filed on Feb. 10, 2020, of the same title, which is incorporated by reference herein for all purposes.

BACKGROUND

To achieve the foregoing and in accordance with the present invention, systems and methods for illuminating indoor aquariums containing plant and animal life that require simulated sunlight for enabling photosynthesis.

Proper maintenance of aquariums is critical for sustaining both aquatic plant life and animal occupants. With the popularity of saltwater aquariums, which provides a wider variety of colorful plants and animals, proper illumination has become more critical.

To simulate the rising, overhead and setting positions of the sun, lighting has to appear to travel from one end to an opposing end of the aquarium. Previous inferior attempts include a bulky and costly overhead light fixture that covers the entire aquarium top surface. The light fixture includes parallel rows of lights that are turned on and off from one end to the opposing ends during the course of a day.

These inferior attempts include a centered lighting fixture that is designed to pan in a downward direction towards the aquarium's top surface in a manner similar to that deployed by a searchlight on a tower. This technique is flawed because of plant and animal life such as corals, beneficial algae and seaweed will result in areas of the aquarium being permanently shadowed. Shadowed coral can result in coral tissue regression and death.

It is therefore apparent that an urgent need exists for a compact illumination system for aquariums that provides light coverage that sweeps a substantial portion of the top surfaces of the aquariums to better simulate natural sunlight during the course of a day.

SUMMARY

To achieve the foregoing and in accordance with the present invention, systems and methods for illuminating aquariums, and in particular, aquariums with plant and animal life requiring simulated sunlight for survival.

In one embodiment, a sweeping illumination system illuminates an aquarium with organisms requiring simulated sunlight for survival. The illumination system includes a downward-facing light housing for illuminating a top surface of the aquarium. A support arm is operatively coupled to the light housing and is directed by a controller, thereby enabling the light housing to sweep a pattern across the top surface of the aquarium. The sweep pattern can be semi-circular or semi-elliptical along a plane substantially parallel to the top surface of the aquarium.

In some embodiments, the illumination system includes a camming mechanism for elongating the sweep pattern of the light housing. The light housing can also have additional freedom of motions relative the support arm.

Note that the various features of the present invention described above may be practiced alone or in combination. These and other features of the present invention will be described in more detail below in the detailed description of the invention and in conjunction with the following figures.

BRIEF DESCRIPTION OF THE DRAWINGS

In order that the present invention may be more clearly ascertained, some embodiments will now be described, by way of example, with reference to the accompanying drawings, in which.

DETAILED DESCRIPTION

The present invention will now be described in detail with reference to several embodiments thereof as illustrated in the accompanying drawings. In the following description, numerous specific details are set forth in order to provide a thorough understanding of embodiments of the present invention. It will be apparent, however, to one skilled in the art, that embodiments may be practiced without some or all of these specific details. In other instances, well known process steps and/or structures have not been described in detail in order to not unnecessarily obscure the present invention. The features and advantages of embodiments may be better understood with reference to the drawings and discussions that follow.

Aspects, features and advantages of exemplary embodiments of the present invention will become better understood with regard to the following description in connection with the accompanying drawing(s). It should be apparent to those skilled in the art that the described embodiments of the present invention provided herein are illustrative only and not limiting, having been presented by way of example only. All features disclosed in this description may be replaced by alternative features serving the same or similar purpose, unless expressly stated otherwise. Therefore, numerous other embodiments of the modifications thereof are contemplated as falling within the scope of the present invention as defined herein and equivalents thereto. Hence, use of absolute and/or sequential terms, such as, for example, "will," "will not," "shall," "shall not," "must," "must not," "first," "initially," "next," "subsequently," "before," "after,"

"lastly," and "finally," are not meant to limit the scope of the present invention as the embodiments disclosed herein are merely exemplary.

Figure 1A:
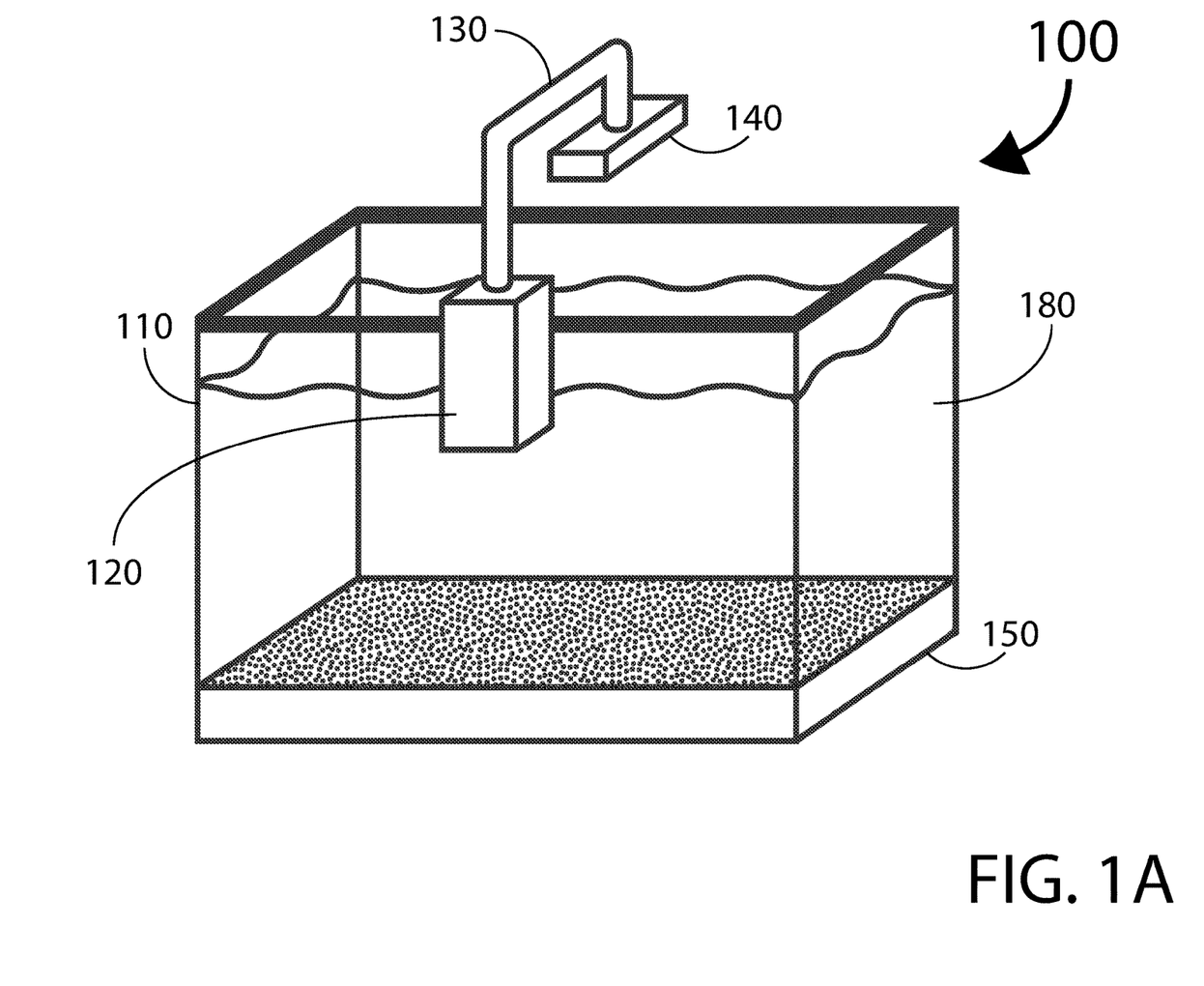
FIG. 1A is a perspective view illustrating one embodiment of a sweeping illumination system for an aquarium in accordance with the present invention.

The present invention relates to systems and methods for illuminating aquariums with organisms requiring simulated sunlight for survival. Referring first to FIG. 1A, a sweeping illumination system 100 is attached to the top of an aquarium 110 filled with water 180 and intended to house aquatic living organisms (not shown). Illumination system 100 includes a controller 120, a support arm 130, and a light housing 140 secured to one end of arm 130.

Figure 1B:
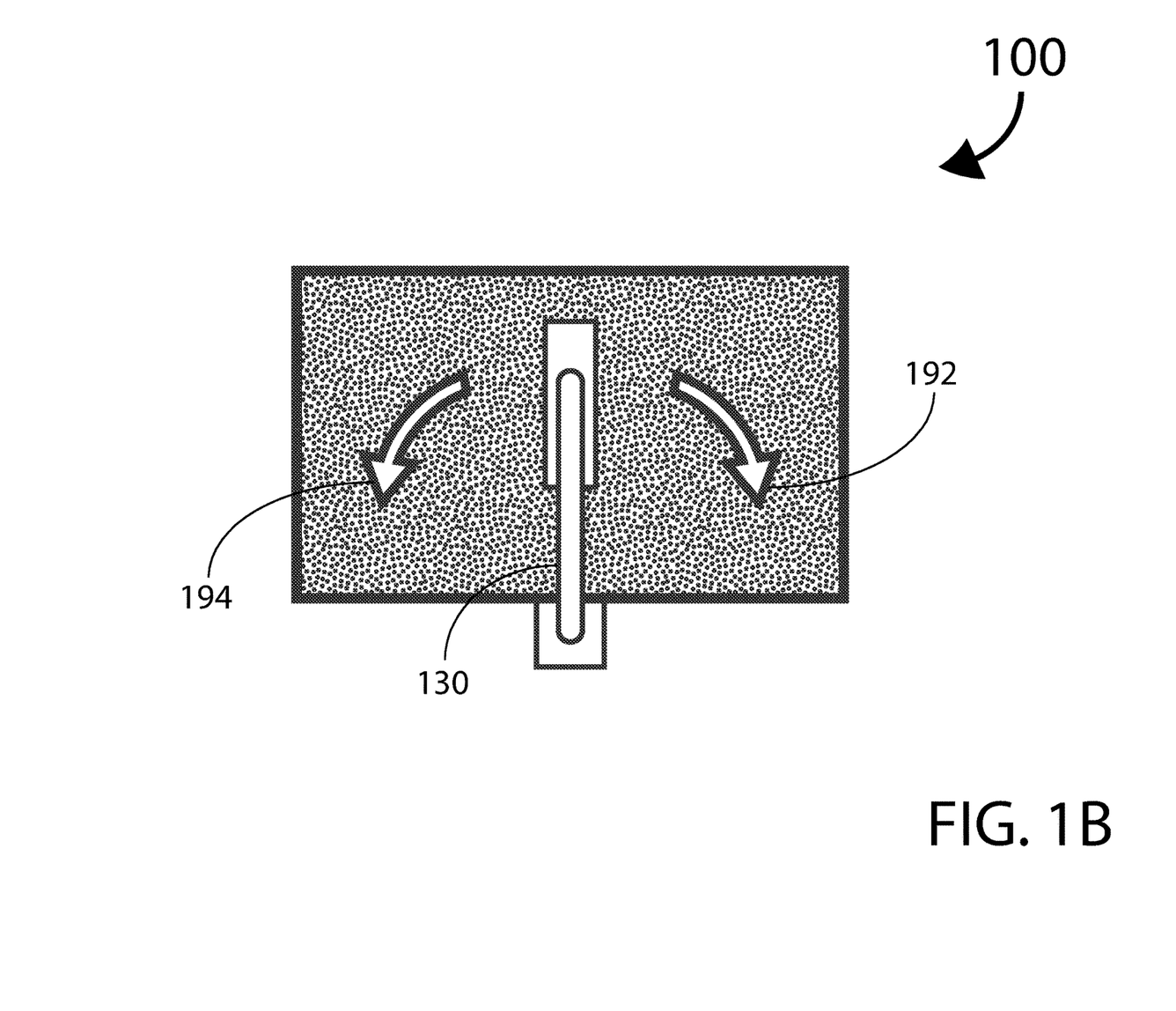
FIG. 1B is a top view depicting a sweeping motion of the illumination system of FIG. 1A.

To facilitate discussion, FIG. 1B is a top view depicting right rotational sweeping motion 192 and left rotational sweeping 194 for arm the illumination system 100. Note that although a complete sweep of arm 130 from a left limit to a right limit is normally timed to simulate a daylight cycle, optional variations can be included to incorporate the four seasons of a solar year experienced by different geographical latitudes.

In some embodiments, the controller 120 includes a stepper motor (not shown) and a control circuit board (not shown) and can be programmed locally, e.g., via a touchscreen, and/or remotely via, for example, a smart phone or a smart assistant device using, for example, Bluetooth or Wi-Fi. System 100 can be powered by a battery (not shown) and/or household AC power (not shown).

Figure 2A:
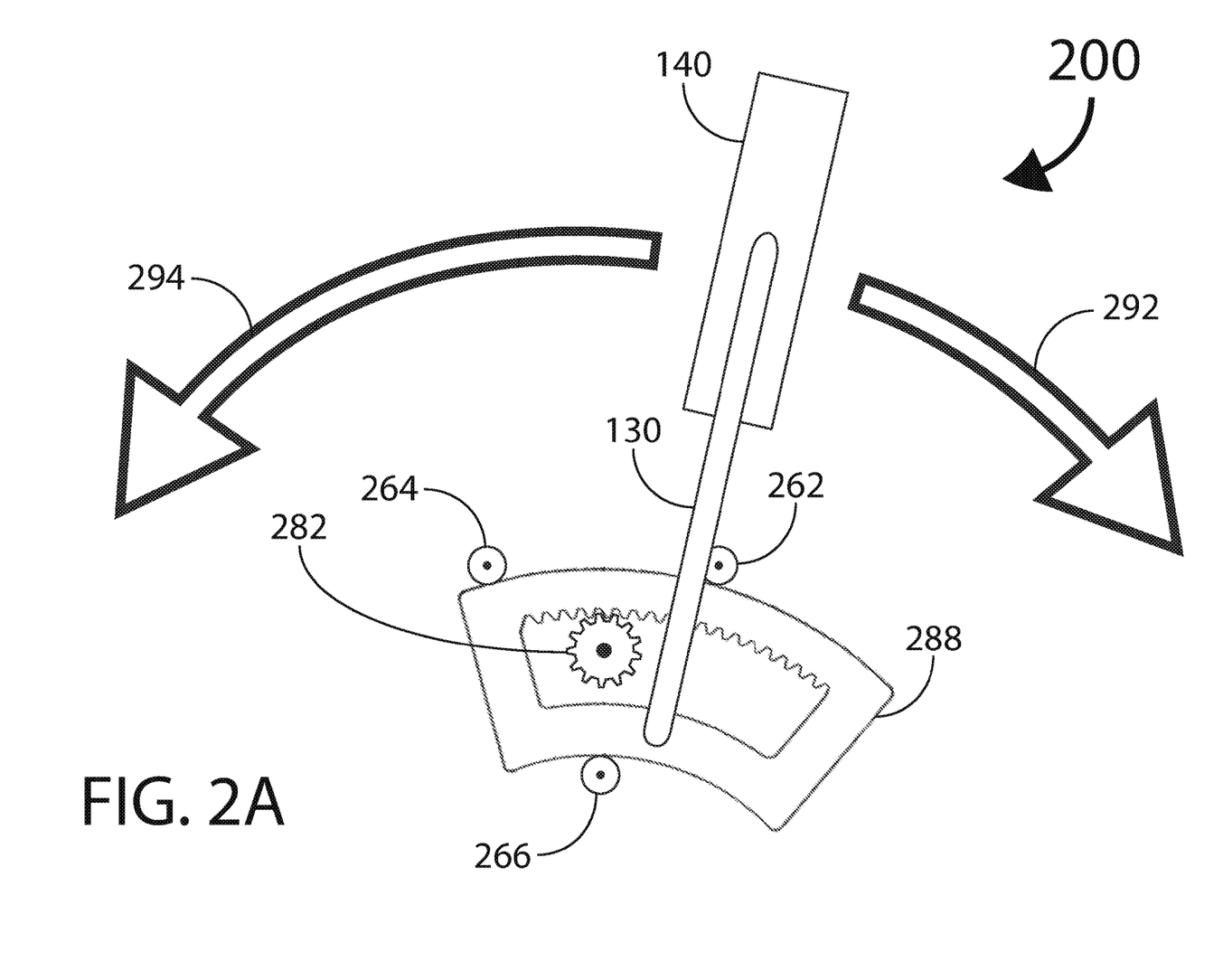
FIGS. 2A and 2B are top views illustrating another embodiment of an illumination system providing an elongated sweeping path in accordance with the present invention.
Figure 2B:
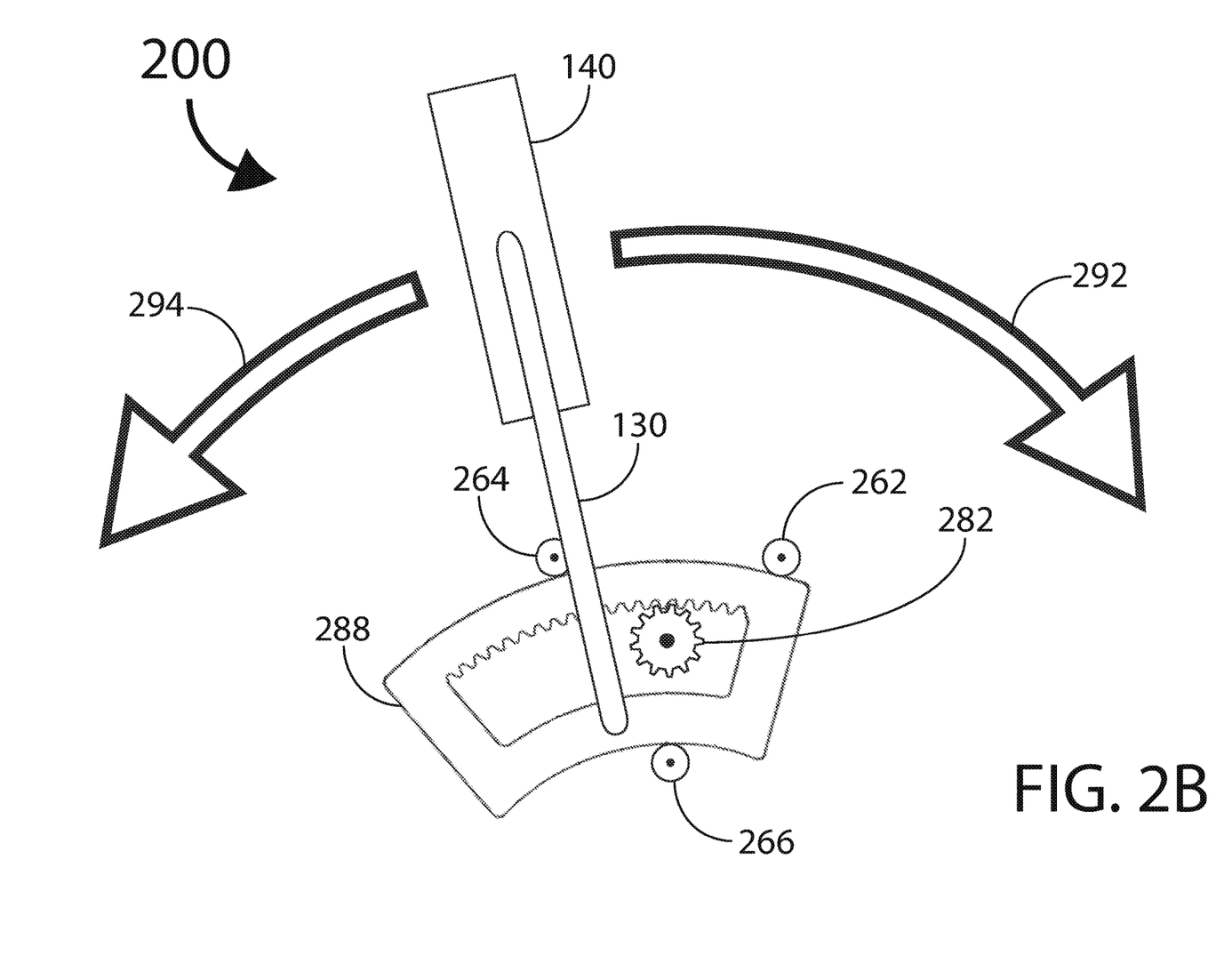

FIGS. 2A and 2B show a right-biased view and a left-biased top view, respectively, illustrating another embodiment of an illumination system 200 providing an elongated sweeping path; from a rightward direction 292 to a leftward direction 294, in accordance with the present invention. System 200 includes an arm 130, and also includes a light housing 140 secured to one end of the arm 130.

In this embodiment, system 200 also includes a camming mechanism to provide the elongated sweeping motion for arm 130 by incorporating a driving gear 282, a cammed guide 288 and two or more supporting bearings, e.g., bearings 262, 264 & 266. The arm 130 is secured to a midline of the guide 288. The guide 288 and the driving gear 282 are operatively coupled to a controller (not shown) that is attached to a vertical wall of an aquarium (not shown).

In some embodiments, the support bearings 262, 264 & 266 can be replaced by one or more lubricated supporting track(s) (not shown). The support bearing(s) and/or support track(s) stabilize the cammed guide 288 and enables the light housing 140 to repeatedly sweep from right to left in a back and forth motion relative to a top surface of an aquarium (not shown).

Figure 3A:
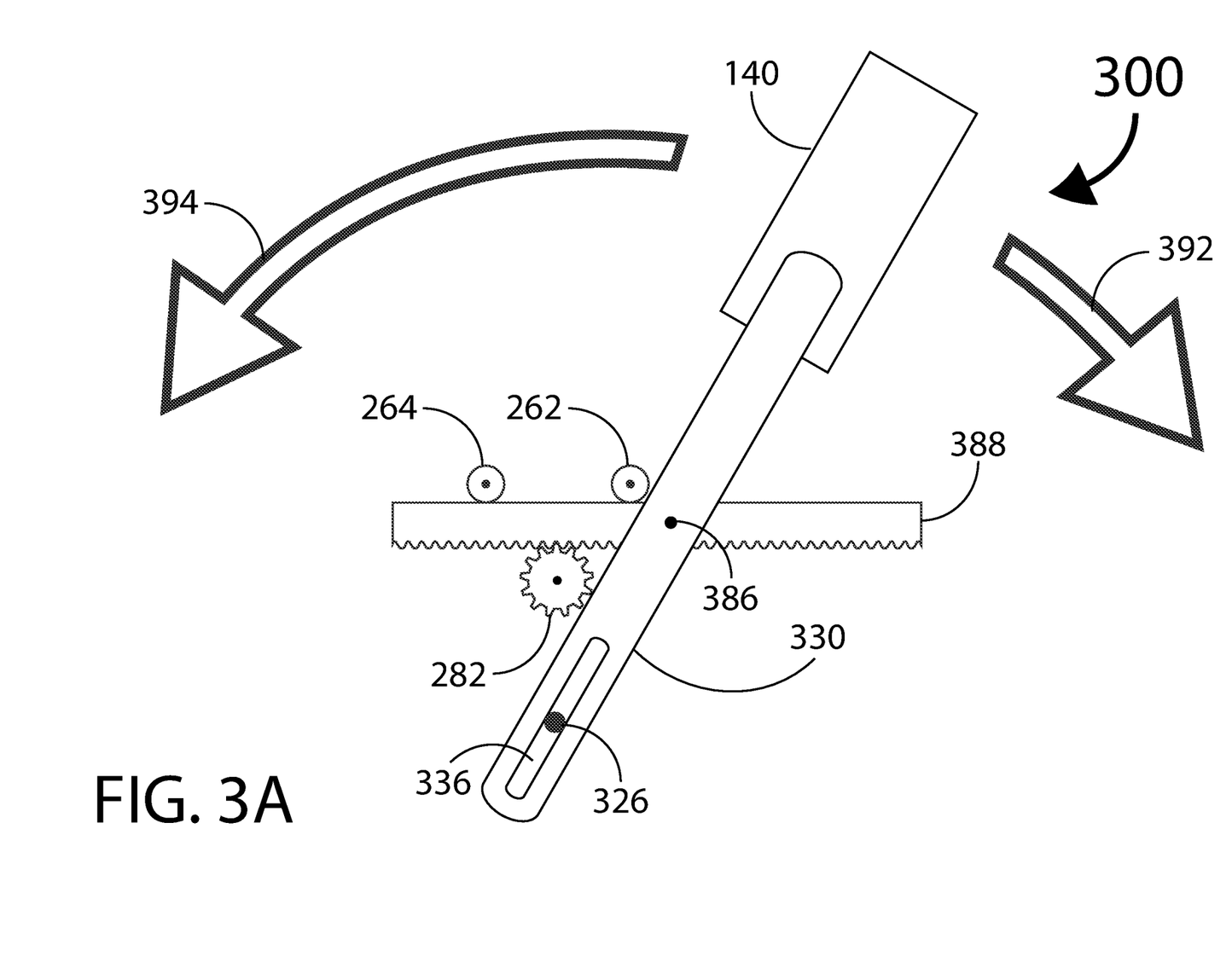
FIGS. 3A and 3B are top views illustrating yet another embodiment of an illumination system providing an elongated sweeping path in accordance with the present invention.
Figure 3B:
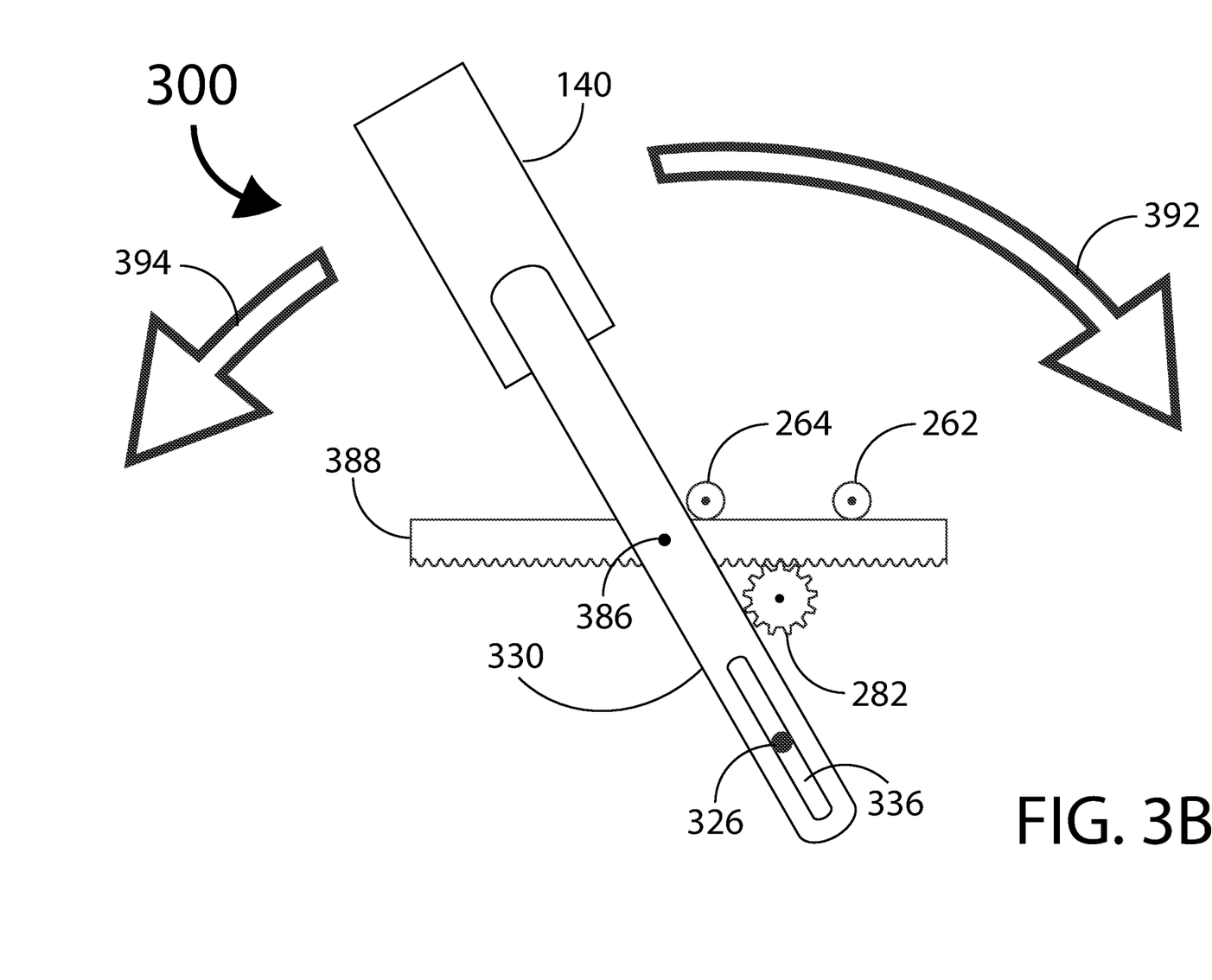

FIGS. 3A and 3B show a right-biased view and a left-biased top view, respectively, illustrating yet another embodiment of an illumination system 300 providing an elongated sweeping path; from a rightward direction 392 to a leftward direction 394, in accordance with the present invention. System 300 includes an arm 330, and also includes a light housing 140 secured to one end of the arm 330.

In this embodiment, system 300 also includes a camming mechanism to provide the elongated sweeping motion for arm 330 by incorporating a driving gear 282, an elongated guide 388 and two or more supporting bearings 262 & 264. The arm 330 is rotatably coupled to a midpoint 386 of the guide 388. A slot 336 of arm 330 is also slidably and rotatably coupled a pivot point 326 of a controller (not shown). The guide 388 and the driving gear 282 are also operatively coupled to the controller which is attached to a vertical wall of an aquarium (not shown).

In some embodiments, support bearings 262 & 264 can be replaced by one or more lubricated supporting track(s) (not shown). The support bearing(s) and/or support tracks(s) stabilize the guide 388 and enables the light housing 140 to repeatedly sweep from right to left in a back and forth motion relative to a top surface of an aquarium (not shown).

Figure 4A:
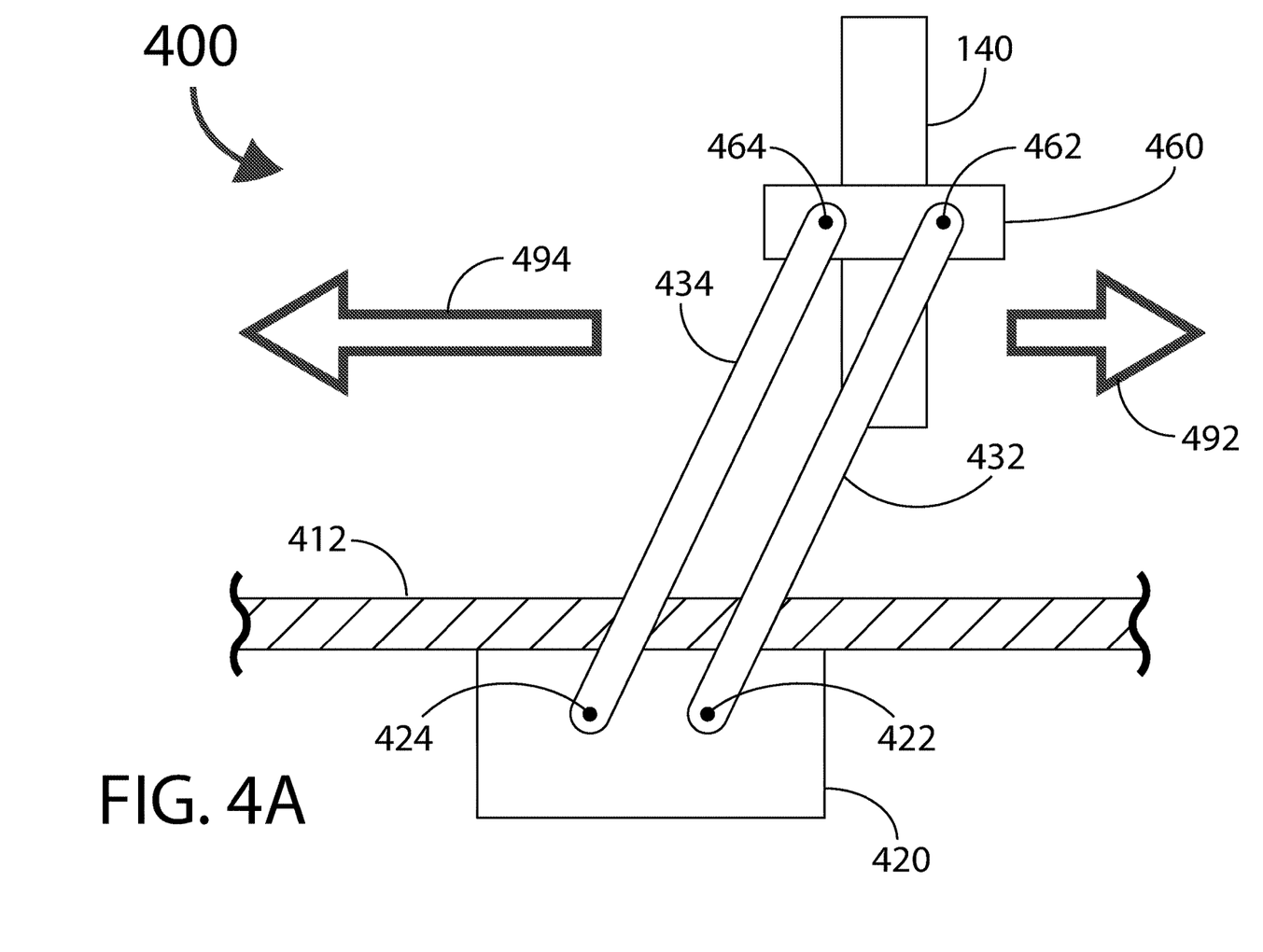
FIGS. 4A and 4B are top views illustrating an embodiment of an illumination system providing a parallel sweeping path in accordance with the present invention.
Figure 4B:
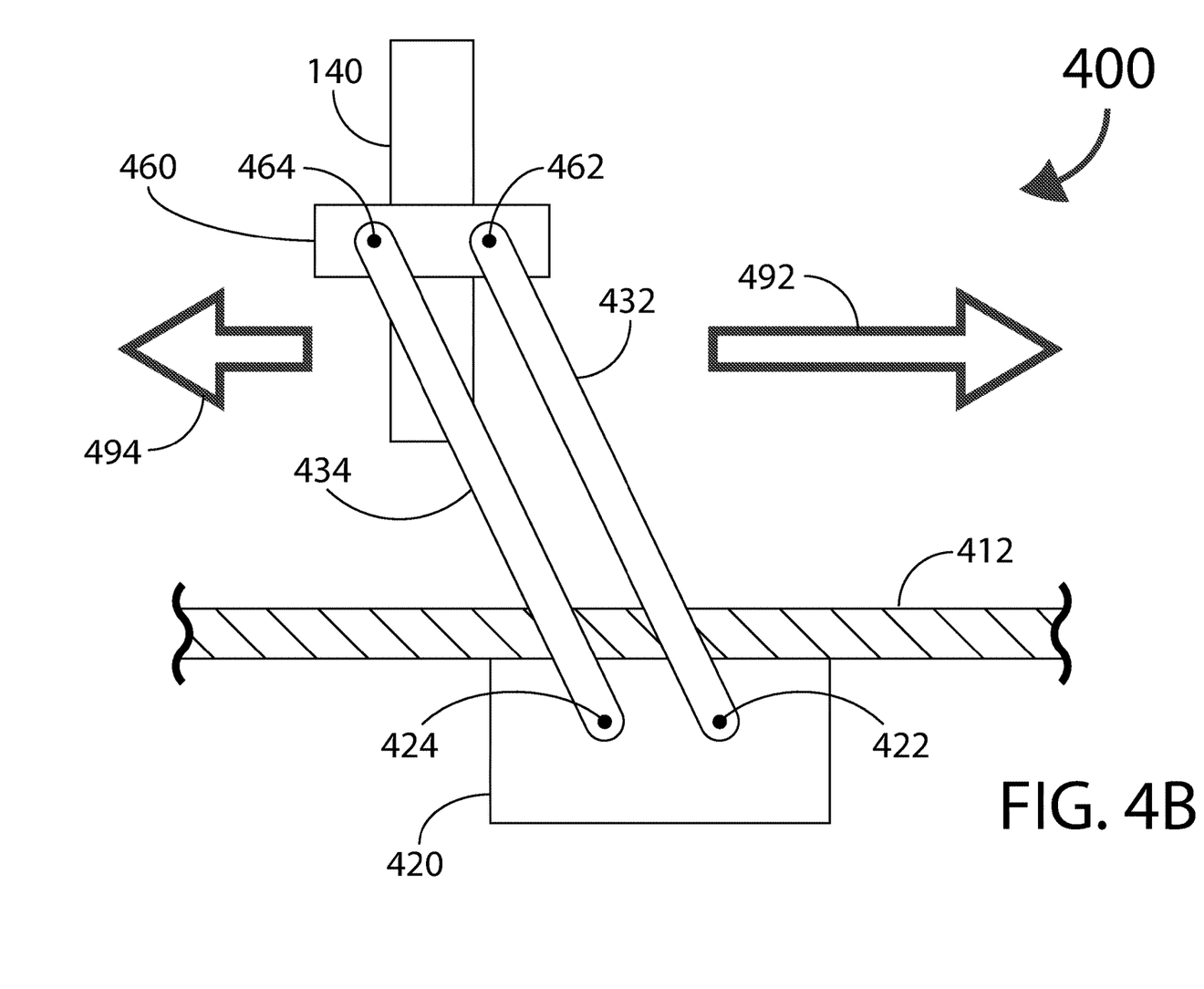

Referring now to FIGS. 4A and 4B, a right-biased view and a left-biased top view, respectively, illustrate an embodiment of an illumination system 400 that provides a substantially parallel sweeping path for light housing 140. In this embodiment, system 400 also includes a pair of substantially parallel arms, i.e., a support arm 432 and a guiding arm 434, and a controller 420 attached to a substantially vertical wall 420 of an aquarium (partially shown).

A housing attachment 460 operatively couples the respective ends of arms 432 & 434 to light housing 140 via pivot pins 462 & 464, respectively, thereby enabling the arms 432 & 434 to rotate synchronously relative the housing attachment 460. The opposing ends of arms 432 & 434 are rotatably coupled to the respective attachment points 422 & 434, respectively, of controller 420. One or both attachments points 422 & 424 are operatively coupled to and powered by a motor such as a stepper motor (not shown).

This arrangement enabling light housing 140 to track a path that remains substantially vertical with respect to the aquarium wall 412, as the housing 140 sweeps from a rightward direction 492 to a leftward direction 494, thereby better simulating a normal source of daylight and also minimizing permanently shadowed areas within the aquarium.

Figure 1C:
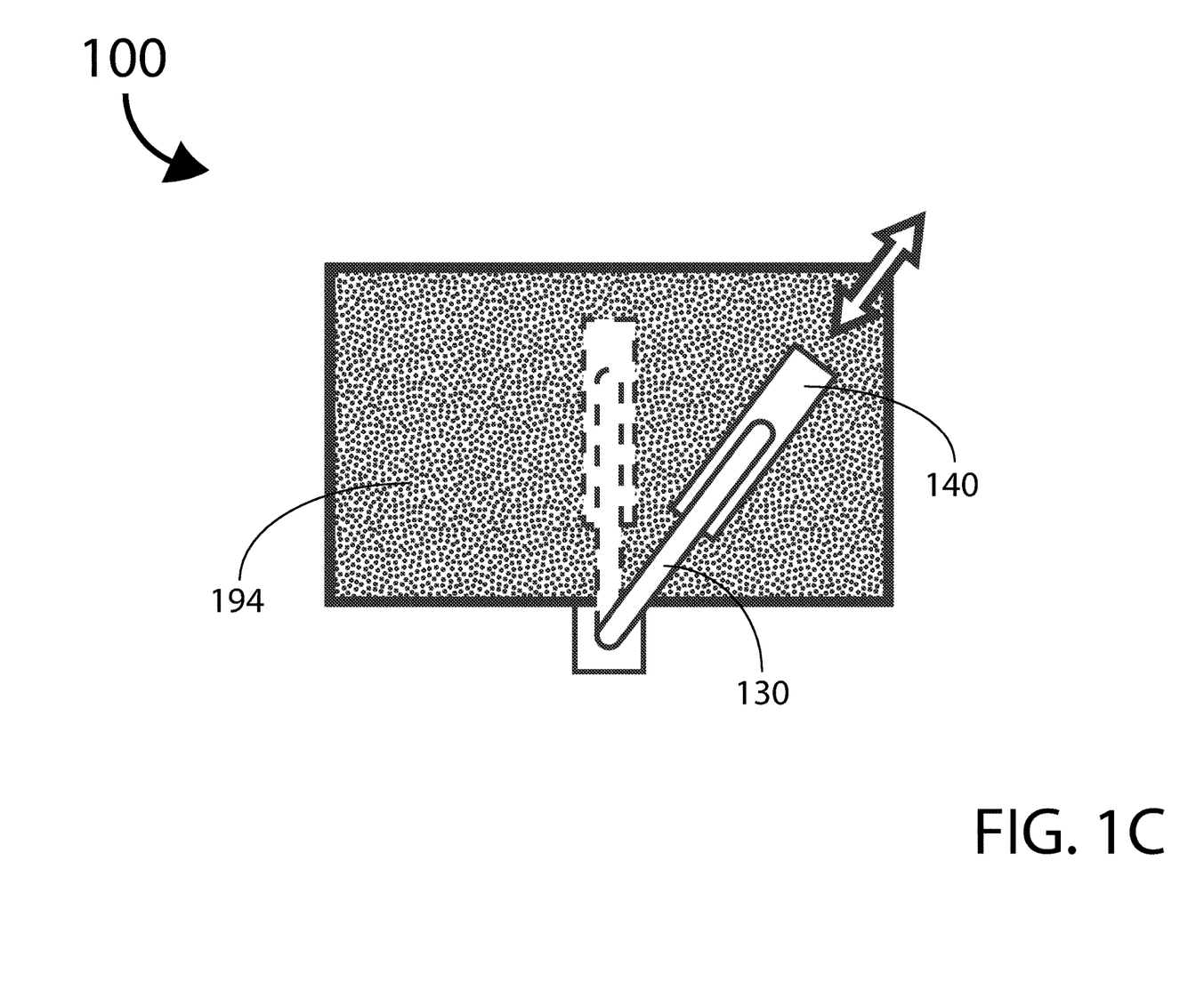
FIG. 1C is another top view depicting an optional extension and retraction capability for a light housing relative to a support arm of the illumination system of FIG. 1A.
Figure 1D:
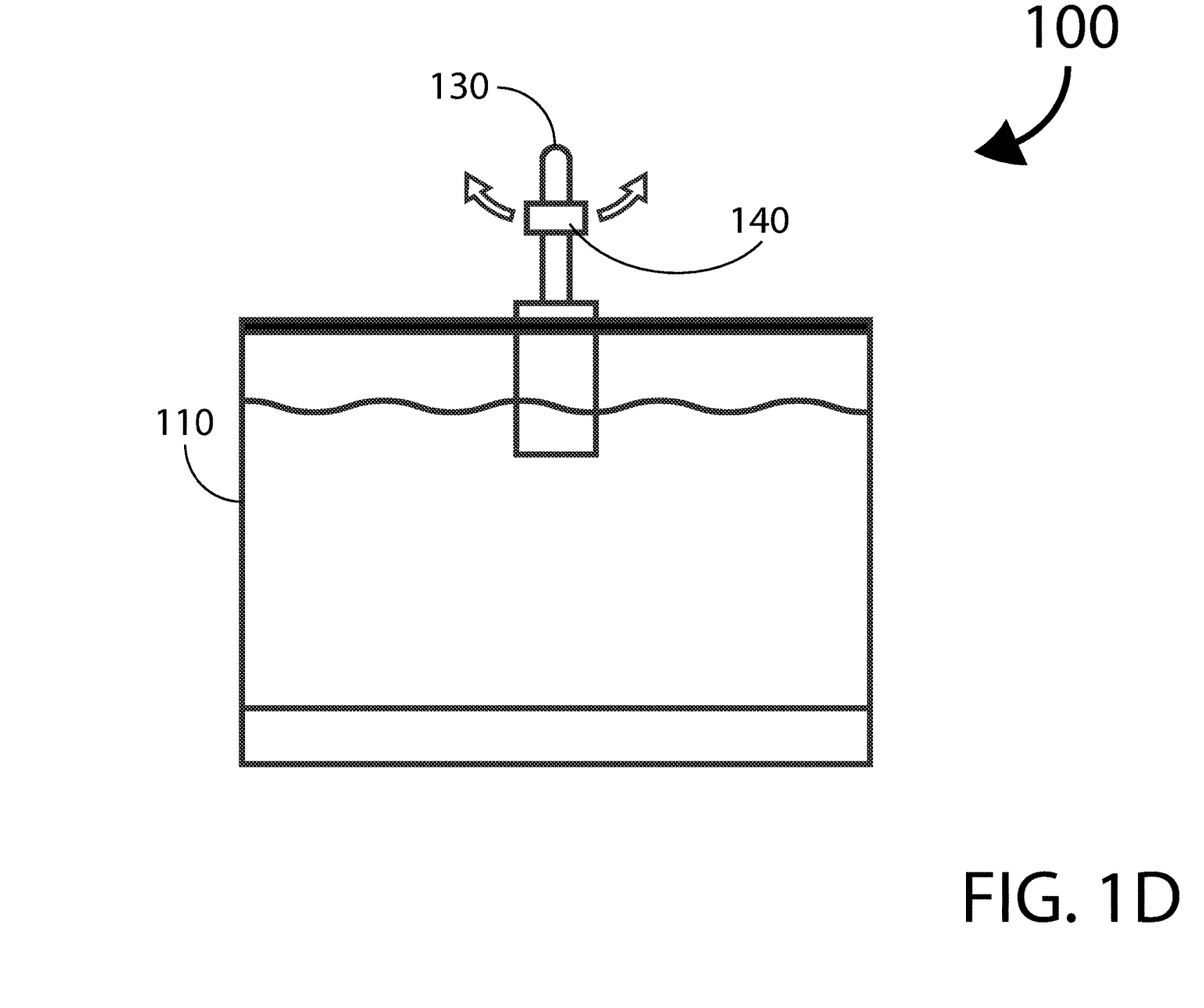
FIG. 1D is a front view depicting an optional rotational capability for a light housing relative to a support arm of the illumination system of FIG. 1A.

Referring back to FIGS. 1C and 1D, light housing 140 can have one or more additional optional freedom of motions relative to support arm 130, such as translational motion and/or rotational motion, respectively. For example, as shown in FIG. 1C, light housing140 may be capable of extending and retracting relative to support arm 130, thereby enabling the light housing 140 to provide a more elongated sweep pattern over the top surface of the aquarium 110.

Many modifications and additions to the above described embodiments are possible. For example, a shorter or longer interval other than the normal 24-hour day-night schedule can be implemented by simply reprogramming the controller, e.g., controllers 120 or 320. It may also possible to combine the above described embodiments, such as combining the camming mechanism of system 200 or system 300 with the dual-arm mechanism of system 400.

It is also contemplated that controllers, e.g., controller 120, can be configured, programmed and/or customized by an end user to adapt the illumination systems to the shape and size of the aquariums, e.g., to adapt the sweep pattern(s) to the dimensions and shape of the aquariums' top surface, and also to adapt the light intensity to the water depth(s) at various aquarium waypoints along the sweep pattern(s). In some implementations, e.g., in a large and/or unusually shaped aquarium, multiple illumination systems can also be installed, with each illumination system programmed to operate synchronously with adjacent system(s) to best simulate sunlight during a normal day/night cycle across the aquarium while minimizing shadowing.

Figure 5:
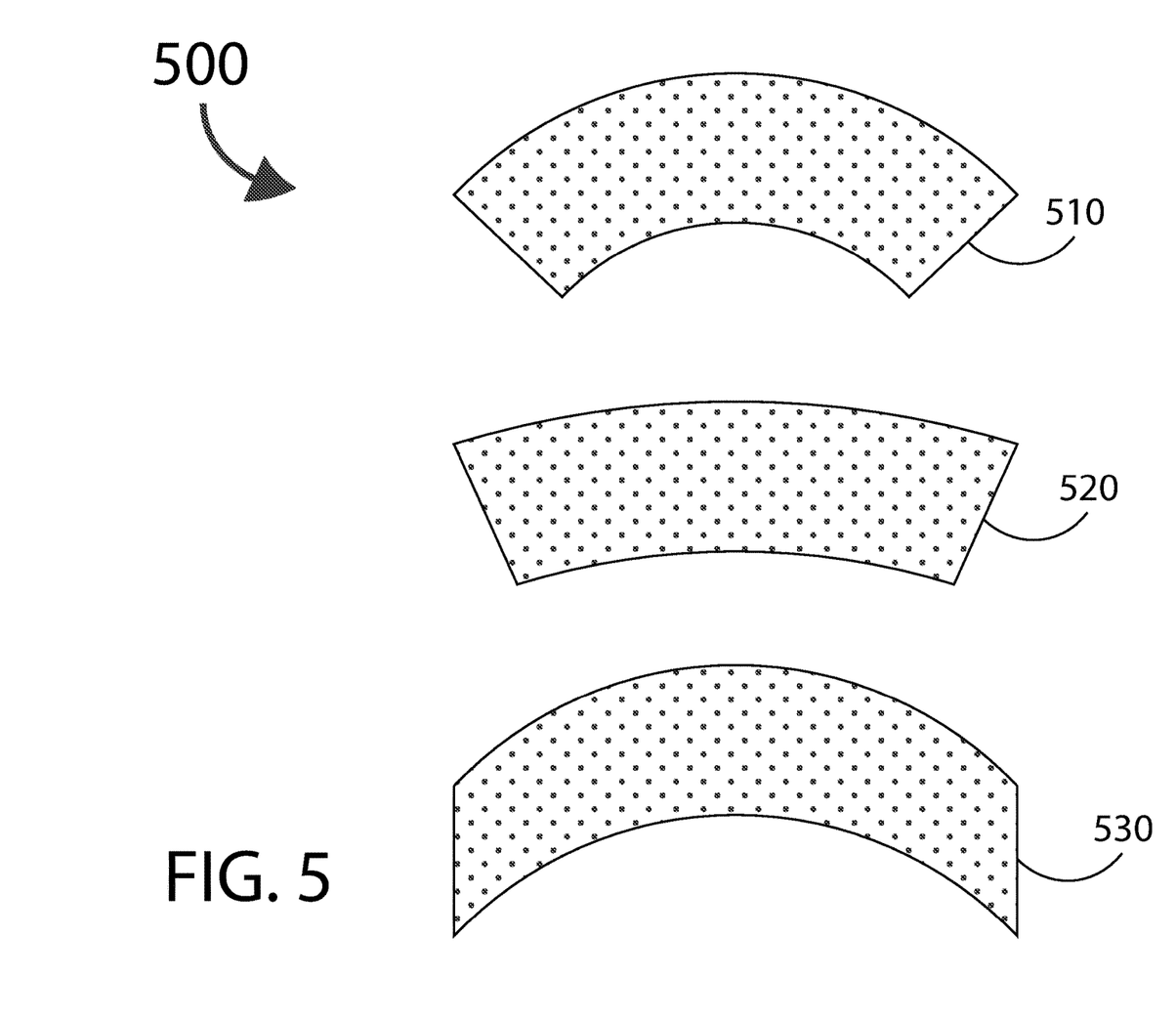
FIG. 5 illustrates exemplary sweep patterns for the light housings of FIGS. 1A, 2A, 3A and 4A.

In sum, as illustrated by FIG. 5, the above described exemplary embodiments advantageously provide customizable and expansive sweep patterns (not to scale) for their respective light housings without the need for a bulky and heavy light housing, relative to aquarium top surface areas. For example, illumination system 100 provides a sweep pattern similar to pattern 510; illumination systems 200 &

300 provide sweep patterns similar to pattern 520; and illumination system 400 provides a sweep pattern similar to pattern 530.

Suitable materials for constructing the various embodiments described above include materials strong enough to prevent deformation while in use, such as, but not limited to thermo-moldable plastics, fiberglass impregnated nylon, carbon fiber composites, epoxy compounds, synthetic resins, steel and/or aluminum alloys, tubing and sheet metal. Note that the various components of the described embodiments may be assembled using joints that can be reinforced by the use of adhesives such as plastic cements or epoxy compounds, and/or by employing techniques such as ultrasonic bonding or heat bonding.

While this invention has been described in terms of several embodiments, there are alterations, modifications, permutations, and substitute equivalents, which fall within the scope of this invention. Although sub-section titles have been provided to aid in the description of the invention, these titles are merely illustrative and are not intended to limit the scope of the present invention. In addition, where claim limitations have been identified, for example, by a numeral or letter, they are not intended to imply any specific sequence.

It should also be noted that there are many alternative ways of implementing the methods and apparatuses of the present invention. It is therefore intended that the following appended claims be interpreted as including all such alterations, modifications, permutations, and substitute equivalents as fall within the true spirit and scope of the present invention.

What is claimed is:

1. A sweeping illumination system for illuminating an aquarium with organisms requiring simulated sunlight for survival, the illumination system comprising:
   a controller;
   a downward-facing light housing for illuminating a top surface of an aquarium;
   a support arm operatively coupled to the light housing and wherein the arm is directed by the controller and enabling the light housing to sweep a pattern across the top surface of the aquarium, and wherein the support arm is operatively coupled to a motor of the controller via a camming mechanism of the controller, thereby elongating the sweep pattern of the support arm; and
   wherein the sweep pattern is semi-circular or semi-elliptical along a plane parallel to the top surface of the aquarium.

2. The illumination system of claim 1 wherein the sweep pattern coincides with a 24-hour day and night cycle.

3. The illumination system of claim 1 wherein the illumination system is attached to the aquarium via a clamp.

4. The illumination system of claim 1 wherein the motor is a stepper motor.

5. The illumination system of claim 1 wherein the light housing is capable of extending and retracting relative to the support arm, thereby elongating the sweep pattern of the light housing.

6. The illumination system of claim 1 further comprising a guiding arm substantially parallel to the support arm, thereby enabling the sweep pattern of the light housing to remain substantially perpendicular to a wall of the aquarium.

7. The illumination system of claim 1 wherein the light housing includes at least one light source for illuminating the top surface of an aquarium.

8. The illumination system of claim 7 wherein the at least one light source is programmed to operate in accordance with an illumination level schedule.

9. The illumination system of claim 8 wherein the illumination level schedule coincides with a 24-hour day and night cycle.

10. The illumination system of claim 8 wherein the illumination level schedule coincides with an annual seasonal cycle.

11. The illumination system of claim 7 wherein the at least one light source is programmed to operate in accordance with a light spectrum schedule.

12. The illumination system of claim 7 wherein the at least one light source is an LED.

* * * * *